United States Patent [19]
Ponchaud et al.

[11] Patent Number: 5,604,006
[45] Date of Patent: Feb. 18, 1997

[54] LABEL INMOLDING PROCESS AND ARTICLE OF MANUFACTURE PRODUCED THEREFROM

[75] Inventors: James A. Ponchaud, Lowell; Kenneth C. Bogard, Wayland, both of Mich.

[73] Assignee: Cascade Engineering, Grand Rapids, Mich.

[21] Appl. No.: 825,021

[22] Filed: Jan. 24, 1992

[51] Int. Cl.$^6$ .............. B32B 3/26; B32B 31/04; B44C 1/26; B44C 1/28
[52] U.S. Cl. .............. 428/67; 156/242; 264/130; 264/135; 264/247; 264/271.1; 264/275; 264/279; 264/328.1
[58] Field of Search .............. 156/242, 245; 264/130, 135, 259, 271.1, 279, 279.1, 328.1, 246, 247, 275

[56] References Cited

U.S. PATENT DOCUMENTS

| | | |
|---|---|---|
| 3,207,822 | 9/1965 | Makowski . |
| 3,270,101 | 8/1966 | Jardine et al. ............ 264/275 |
| 3,517,805 | 2/1968 | Gould . |
| 3,620,871 | 11/1971 | Benzon-Peterson ........ 156/245 |
| 3,652,359 | 3/1972 | Decker . |
| 3,654,062 | 4/1972 | Loew ............ 156/245 |
| 3,668,034 | 6/1972 | Nicholas et al. ............ 156/245 |
| 3,755,031 | 8/1973 | Hoffman et al. . |
| 3,759,776 | 9/1973 | Decker . |
| 3,814,653 | 6/1974 | Heier . |
| 3,814,658 | 6/1974 | Decker . |
| 4,053,545 | 10/1977 | Fay . |
| 4,289,817 | 9/1981 | Valyi . |
| 4,350,732 | 9/1982 | Goodwin . |
| 4,531,994 | 7/1985 | Holtrop et al. . |
| 4,639,341 | 1/1987 | Hanamoto et al. . |
| 4,710,338 | 12/1987 | Bagnall et al. . |
| 4,728,477 | 3/1988 | Dromigny . |
| 4,904,324 | 2/1990 | Heider . |
| 4,973,364 | 11/1990 | Farrar et al. . |
| 4,983,349 | 1/1991 | Krall et al. . |
| 4,984,320 | 1/1991 | Curley, Jr. et al. . |

FOREIGN PATENT DOCUMENTS

| | | | |
|---|---|---|---|
| 952674 | 8/1974 | Canada ............ 264/247 |
| 18025 | 6/1970 | Japan ............ 264/246 |
| 114375 | 9/1979 | Japan ............ 264/271.1 |
| 135856 | 10/1979 | Japan ............ 264/271.1 |
| 34913 | 3/1980 | Japan ............ 264/247 |
| 39338 | 3/1980 | Japan ............ 264/271.1 |

*Primary Examiner*—Michael W. Ball
*Assistant Examiner*—Richard Crispino
*Attorney, Agent, or Firm*—Varnum, Riddering, Schmidt & Howlett LLP

[57] ABSTRACT

A process for producing a label bearing article (10) calls for an adhesive mounting of a label (16) to an exterior surface (14) of a thin thermoplastic substrate (12), and placing the thermoplastic substrate (12) and the affixed label (16) into a mold cavity of an injection molding apparatus with the label bearing exterior surface (14) against a wall of the mold cavity. A molten thermoplastic resin is injected into the mold cavity under pressure so that the resin contacts an interior surface (15) of the thermoplastic substrate (12) to thereby firmly press the exterior surface (14) of the thermoplastic substrate (12) and the affixed label (16) against the wall of the mold cavity, thereby forming the composite article (10). Sufficient heat and pressure are provided within the mold cavity to at least partially recess the label (16) into the exterior surface (14) of the thermoplastic substrate (12) and integrally mold the thermoplastic substrate (12) to the label (16). The composite article (10) is then cooled and removed from the mold cavity.

13 Claims, 3 Drawing Sheets

```
┌─────────────────────────────────┐
│   VACUUM FORM OR THERMOFORM     │
│       DECORATIVE INSERT         │
└─────────────────────────────────┘
                │
┌─────────────────────────────────┐
│   ADHESIVELY SECURE LABEL TO AN │
│   OUTER SURFACE OF DECORATIVE   │
│             INSERT              │
└─────────────────────────────────┘
                │
┌─────────────────────────────────┐
│  PLACE DECORATIVE INSERT AND ADHESIVELY │
│   SECURED LABEL INTO MOLD CAVITY OF     │
│   INJECTION MOLDING APPARATUS WITH      │
│    LABEL AGAINST MOLD CAVITY WALL       │
└─────────────────────────────────┘
                │
┌─────────────────────────────────┐
│   INJECT THERMOPLASTIC MATERIAL INTO    │
│  MOLD CAVITY AGAINST INSIDE SURFACE OF  │
│  INSERT UNDER HEAT AND PRESSURE TO MOLD │
│   ARTICLE AND INTEGRALLY BOND INSERT    │
│    TO ARTICLE AND INDENT LABEL INTO     │
│        OUTSIDE SURFACE OF INSERT        │
└─────────────────────────────────┘
                │
┌─────────────────────────────────┐
│    COOLING OF THE THERMOPLASTIC │
│      MATERIAL TO A SOLID FORM   │
└─────────────────────────────────┘
                │
┌─────────────────────────────────┐
│   REMOVING COMPOSITE ARTICLE FROM │
│           MOLD CAVITY             │
└─────────────────────────────────┘
```

FIG. 6

LABEL INMOLDING PROCESS AND ARTICLE OF MANUFACTURE PRODUCED THEREFROM

BACKGROUND OF THE INVENTION

1. Field of the Invention

This invention relates to a process of inmolding a label, decal, logo plate, badge, graphic or insignia to an injected molded article and to the article of manufacture produced by such a process.

2. Description of the Related Art

Labels, decals, logo plates, badges, graphics or insignias (hereinafter "labels") have been heretofore applied to an exterior surface of an article. A common practice is to adhesively secure the label to the article after injection molding of the article. However, the adhesively secured label tends to be frequently damaged in subsequent shipping and handling operations and during use of the finished product. All too often, the label adheres poorly and is completely removed from the article, thereby giving the article an unattractive appearance.

It has been found that a label can be placed inside an injection mold cavity to inmold the label to a thermoplastic article. U.S. Pat. No. 4,710,338, issued Dec. 1, 1987 to Bagnall et al., discloses one such inmolding method wherein a label is placed in a mold cavity and a thermoplastic resin is then injected into the mold cavity and against the label. Upon cooling, the label becomes embedded in the thermoplastic material. The thermoplastic material impregnates the fibers of the label, thereby eliminating the need for an adhesive.

Although the process disclosed in the Bagnall et al. patent may be preferable to the conventional means for adhering a label to a thermoplastic material, the process is undesirable in many respects. For instance, it is difficult to produce a finished product which has the label appropriately positioned thereon because the label may move slightly during the injection molding process. Secondly, due to the nature of the label material, adhesion between this material and the injected thermoplastic material may not be sufficient to ensure adherence between the label and the thermoplastic material during the full expected life of the finished product.

Thus, there is a need for a process which is capable of sufficiently adhering a label to a thermoplastic material. The process must produce a label which is appropriately positioned on and firmly adhered to the thermoplastic material. It would be most preferable if a longer lasting adherence between the label and the thermoplastic material could be achieved.

SUMMARY OF THE INVENTION

According to the invention, there is provided a process for producing a label-bearing article. A label is adhesively mounted to a first side of a thin thermoplastic substrate, and the affixed label and thermoplastic substrate are placed into a mold cavity of an injection molding apparatus so that the label-bearing first side bears against a wall of the mold cavity. A molten thermoplastic resin is injected under heat and pressure into the mold cavity so that the resin contacts a second side of the thermoplastic substrate to thereby firmly press the first side of the thermoplastic substrate and the affixed label against the wall of the mold cavity, thereby forming the label-bearing article. Sufficient heat and pressure are provided within the mold cavity to at least partially recess the label into the first side of the thermoplastic substrate and integrally mold the thermoplastic substrate to the label. Subsequently, the thermoplastic resin is cooled to a solid form, and the composite article is removed from the mold cavity.

The thermoplastic substrate can comprise a thin sheet. Preferably, the thermoplastic substrate comprises a thin thermoplastic paint sheet.

The following types of adhesives can be used to adhesively mount the label to the thermoplastic substrate: a pressure sensitive adhesive, a heat sensitive adhesive and a wet adhesive.

The label can comprise a decal, logo plate, badge, graphic or insignia. Further, the label can comprise a thin sheet of thermoplastic material, a metal plate or a sheet of paper.

It is also contemplated that a protective sheet of material can be removably affixed to the label and disposed between the label and the wall of the mold cavity during the resin injection step. The protective sheet of material can be removed from the label as a final step in the process.

The thermoplastic resin which is injected into the mold cavity can be selected from the group of materials consisting of polycarbonates, ABS, thermoplastic olefins, nylons, polyesters and blends thereof.

In another of its aspects, the invention relates to an article of manufacture produced by the above process. In yet another aspect of the invention, an article of manufacture comprises a substrate comprising a thin sheet, the substrate having a first side and an opposing second side. The article includes a thermoplastic body which is integrally molded to the second side of the substrate. A label is affixed to the first side of the substrate and at least partially recessed into the first side of the substrate. The substrate and the thermoplastic body can comprise the same or different compositions.

BRIEF DESCRIPTION OF THE DRAWINGS

The invention will now be described with reference to the drawings in which:

FIG. 6 is a block diagram showing the steps carried out according to the process of the invention.

DETAILED DESCRIPTION OF THE PREFERRED EMBODIMENTS

It has been found that a label, decal, logo plate, badge, graphic or insignia can be adhesively secured to one side of a decorative insert, and a thermoplastic backing can then be inmolded to the opposing side of the decorative insert, thereby integrally molding the label, decal, logo plate, badge, graphic or insignia to the decorative insert. The finished product has many applications, and can especially be used for interior trim applications for automobiles.

Figure 1:
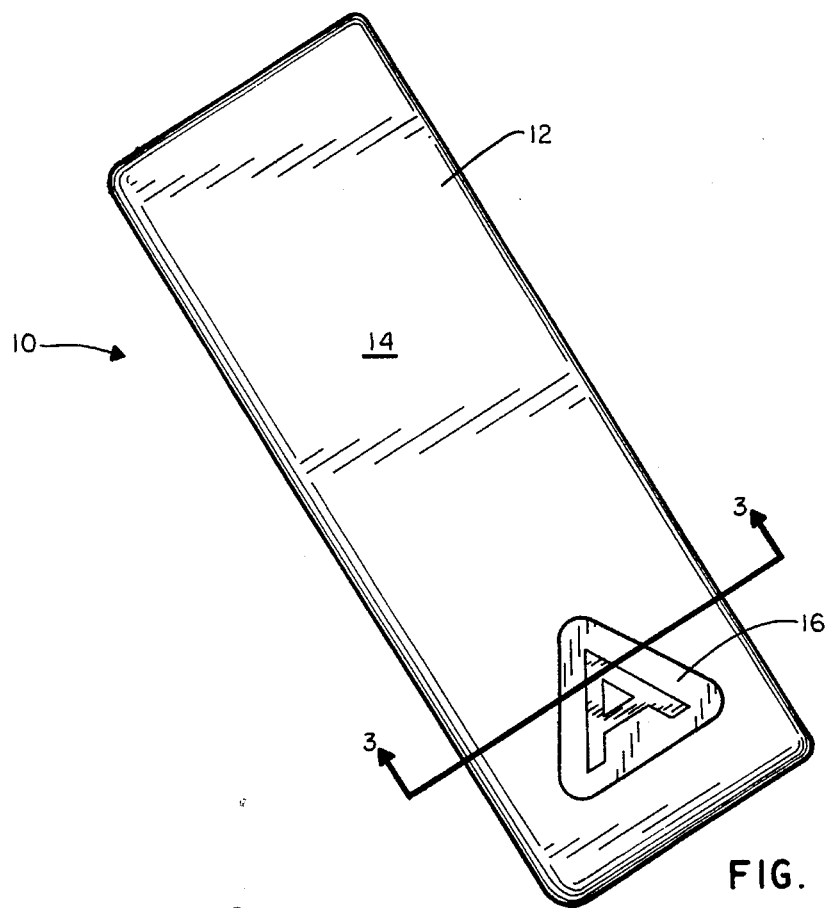
FIG. 1 is a top perspective view of a composite thermoplastic article according to the invention, the article comprising a thermoplastic body, a decorative insert firmly affixed to the thermoplastic body, and a label, decal, logo plate, badge, graphic or insignia adhered to and recessed into the decorative insert.
Figure 2:
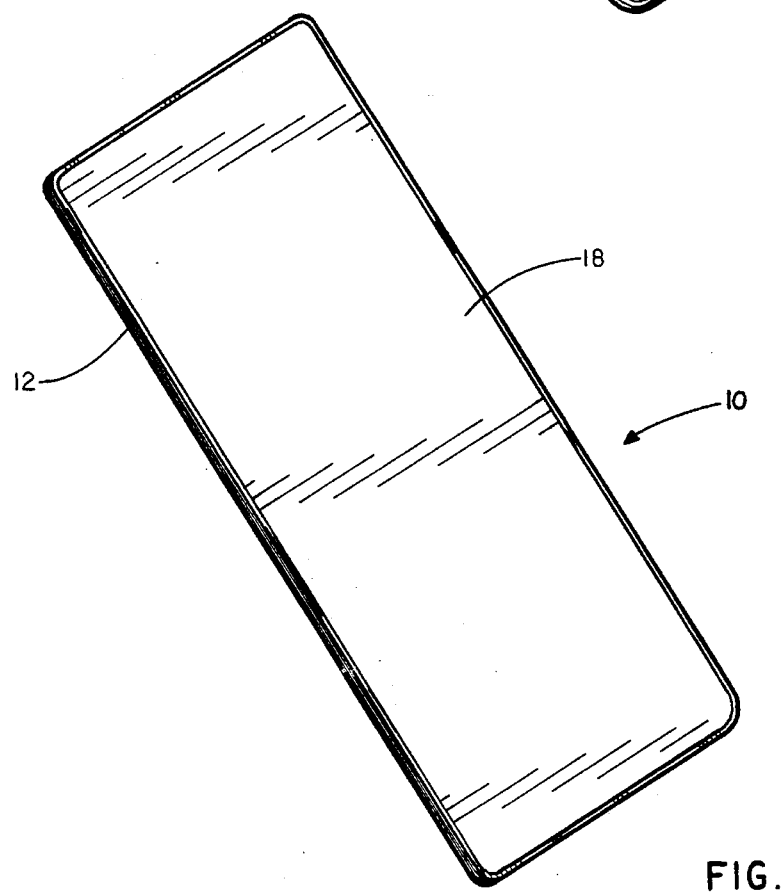
FIG. 2 is a rear perspective view of the composite article shown in FIG. 1.
Figure 3:
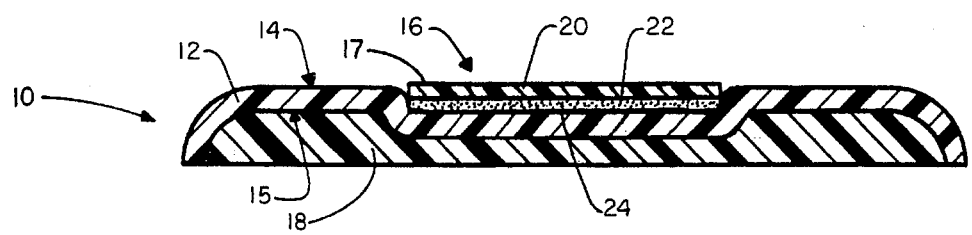
FIG. 3 is an enlarged section taken along lines 3—3 of FIG. 1.

Referring to FIGS. 1–3, a composite article 10 can be produced according to the invention. The composite article 10 includes a decorative insert, inlay, foil or preform 12 (hereinafter referred to as "the decorative insert 12") having an exterior surface 14 and an interior surface 15 (FIG. 3) to which is firmly secured a thermoplastic body 18 as best shown in FIGS. 2 and 3. Referring to FIGS. 1 and 3, the exterior surface 14 of the decorative insert 12 is preferably generally continuous but the decorative insert 12 includes a recess 24 (FIG. 3) which receives a label, decal, logo plate, badge, graphic or insignia 16 (hereinafter referred to as "the label 16"). Referring to FIG. 3, the label 16 includes a thermoplastic layer 20 which preferably includes any desired artwork or decoration. The label 16 also comprises an adhesive backing 22 which is used to secure the label 16 to the decorative insert 12. The label 16 is recessed into the exterior surface 14 of the decorative insert 12, and can either be partially recessed into the decorative insert 12 as shown or fully recessed into the decorative insert 12. It has been found that because the label 16 is recessed into the exterior surface 14 of the decorative insert 12 and thereby embedded in the decorative insert 12, a superior and long-lasting adhesion is thereby produced. Further, the recessed label 16 is resistant to being damaged during subsequent shipping and handling of the composite article 10 and during use of the composite article 10.

Figure 4:
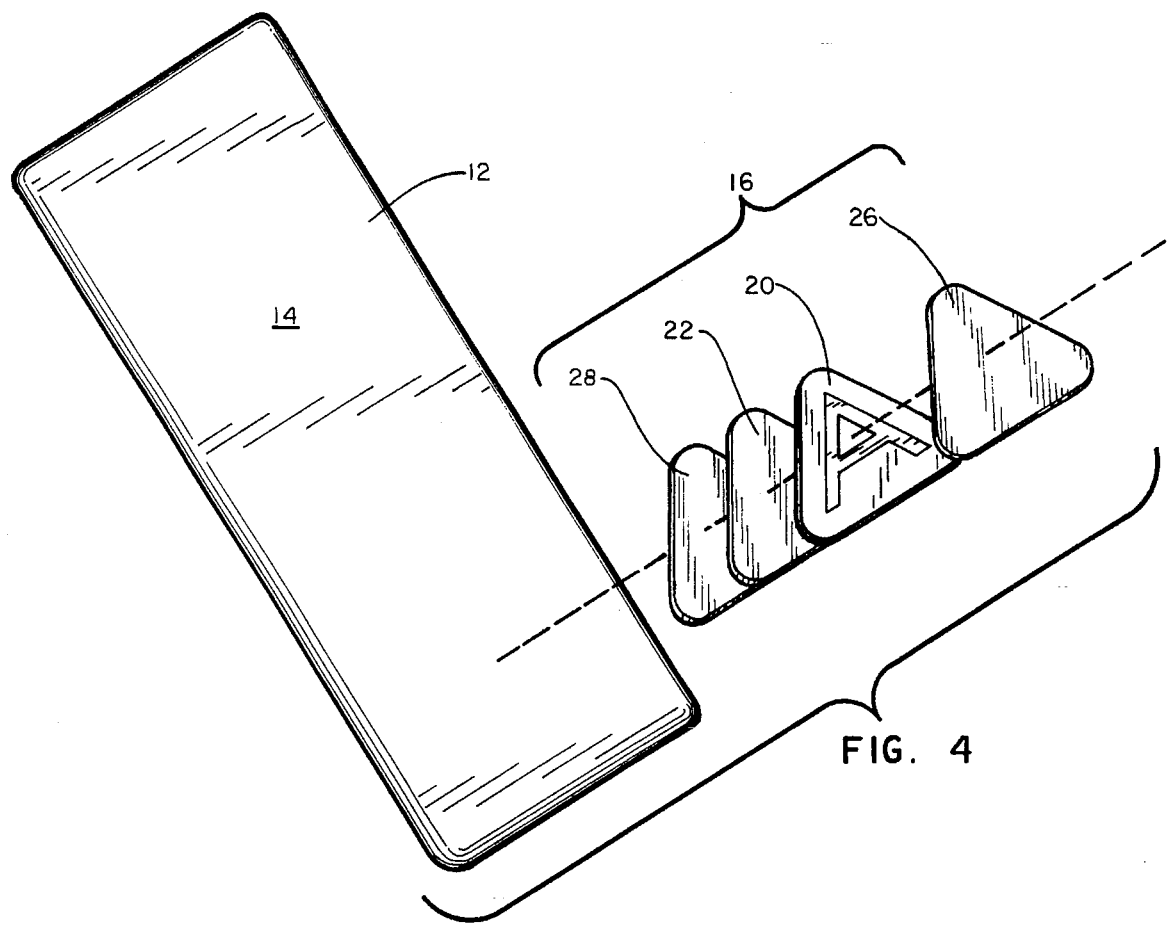
FIG. 4 is a top perspective view of the decorative insert and the label, decal, logo plate, badge, graphic or insignia.

The process for producing the composite article 10 is best described with reference to FIGS. 4–6. The process requires as a first step the provision of the decorative insert 12. Typically, the decorative insert 12 comprises a thin thermoplastic substrate which is vacuum formed or thermoformed in a conventional operation well known to those of ordinary skill in the art. This first step of the process is shown as step 30 in FIG. 6. As shown in FIG. 4, the label 16 preferably includes in addition to the thermoplastic layer 20 and the adhesive backing 22, a protective carrier 26 removably secured to the thermoplastic layer 20 and a release carrier 28 removably secured to the adhesive backing 22. The protective carrier 26 protects the artwork of the thermoplastic layer 20 until such time as the thermoplastic layer 20 and the adhesive backing 22 of the label 16 are recessed into the decorative insert 12 during an inmolding operation described in further detail below. The release carrier 28 prevents degradation of the adhesive backing 22 until such time as a second step 32 (FIG. 6) of the process is carried out wherein the release carrier 28 is removed to expose the adhesive backing 22.

As shown in FIG. 6, a third step 34 of the process requires a positioning of the label 16 over the exterior surface 14 of the decorative insert 12 and a pressing of the label 16 against the exterior surface 14 of the decorative insert 12. A fourth step 36 in the process requires a removal of the protective carrier 26 from the thermoplastic layer 20 to thereby expose the artwork of the thermoplastic layer 20. A fifth step 38 in the process calls for placing the decorative insert 12 and the adhesively secured label 16 into a mold cavity of an injection molding apparatus with the label bearing exterior surface 14 of the decorative insert 12 against a wall of the mold cavity. A sixth step 40 in the process calls for injecting a thermoplastic material against the interior surface 15 of the decorative insert 12, the interior surface 15 of the decorative insert 12 being disposed opposite from the exterior surface 14 of the decorative insert 12 where the label 16 is disposed. A seventh step 42 in the process calls for a cycling of the injection molding apparatus so that the injected thermoplastic material cools, and thereafter removing the composite article 10 from the mold cavity.

Figure 5:
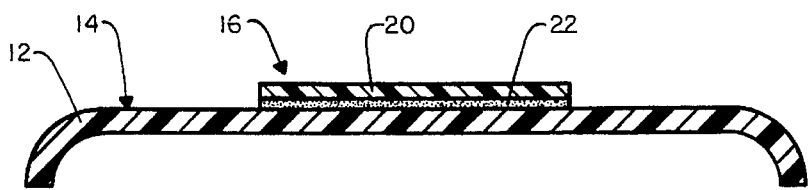
FIG. 5 is a view similar to FIG. 3 but illustrating the composite article as it appears prior to an injection molding step forming a part of the process of the invention.

The appearance of the decorative insert 12 and the label 16 upon completion of the fourth step 36 in the process is best shown in FIG. 5. As clearly shown in FIG. 5, upon completion of the fourth step 36, the label 16 is merely adhesively secured to the exterior surface 14 of the decorative insert 12, and the recess 24 and the thermoplastic body 18 of the composite article 10 have not yet been formed.

Referring to FIG. 3, during the seventh step 42, heat and pressure within the mold cavity are sufficient to at least partially recess the label 16 into the exterior surface 14 of the decorative insert 12 and integrally mold the decorative insert 12 to the label 16. The label 16 is either partially or completely recessed into the recess 24 in the exterior surface 14 of the decorative insert 12. An exterior surface 17 of the label 16 is generally planar or close to being generally planar with the exterior surface 14 of the decorative insert 12. The thermoplastic body 18 has also been formed during the injection molding process and is integrally molded to the interior surface 15 of the decorative insert 12.

With respect to the materials used in forming the composite article 10, the decorative insert 12 comprises a thin sheet of thermoplastic material. This thermoplastic material should be compatible with the thermoplastic material which is injected into the injection molding apparatus to form the thermoplastic body 18. Preferably, the decorative insert 12 comprises a polycarbonate, ABS, a blend of polycarbonate and ABS, a nylon, a polyester or a thermoplastic olefin such as polyethylene or polypropylene. The decorative insert 12 preferably has a thickness in the range of about 0.020–0.030" (inches). Preferably, the decorative insert 12 also comprises a paint film (a new proprietary product which is available from Avery Corporation, Rexan Corporation or the Minnesota Mining & Manufacturing Corporation), the paint film comprising a thin film of paint which can be rolled or poured onto the thermoplastic substrate. The decorative insert 12 can also comprise a thermoplastic substrate which has a wood grain print on its exterior surface. As alluded to above, the decorative insert 12 provides a decorative outer surface for the composite article 10.

The material of the adhesive backing 22 must be compatible with the material of the decorative insert 12. Although the adhesive backing 22 preferably comprises a conventional pressure sensitive adhesive, the adhesive backing 22 can also comprise a conventional wet adhesive or heat activated adhesive. The thermoplastic layer 20 of the label 16 can be made of any thermoplastic material, and preferably has a thickness which is less than 3 to 5 millimeters. However, it is contemplated that the layer 20 could comprise a metal plate or a sheet of paper. The layer 20 could also be laminated with various materials to create desired visual effects.

The thermoplastic material which is injected into the injection molding apparatus to form the thermoplastic body 18 must be an injection moldable thermoplastic material which is capable of sufficiently bonding to the decorative insert 12. Preferably, this thermoplastic material comprises a polycarbonate, ABS, a blend of polycarbonate and ABS, a nylon, a polyester or a thermoplastic olefin such as polyethylene or polypropylene. It is contemplated that the thermoplastic body 18 and the decorative insert 12 can comprise the same or different compositions.

The process of the present invention and the composite article 10 produced therefrom enjoy many advantageous features. For example, a strong and long lasting adhesion is produced between the label 16 and the decorative insert 12. Because the label 16 is actually recessed into the exterior surface 14 of the decorative insert 12, the label 16 is not subject to as much wear and tear during use as labels mounted directly to an exterior surface because the exterior surface 17 (FIG. 3) of the label 16 is generally flush or close to being generally flush with the exterior surface 14 of the decorative insert 12. In addition, the label 16 of the composite article 10 is resistant to damage during subsequent shipping and handling and use of the composite article 10. Because the process of the present invention secures the label 16 to the decorative insert 12 by use of the adhesive backing 22, the label 16 is much less apt to move and become slightly misaligned during the injection molding step.

EXAMPLE

A thin film of paint (paint film) was applied to a 0.025" (inch) thick plastic substrate comprising ABS. The substrate, including the paint film, was then thermoformed to form a decorative insert. A thin decal was adhesively secured to an exterior surface of the decorative insert by using a hot stamping process. The decal was firmly pressed against the decorative insert to eliminate air pockets between the decal and the decorative insert. The insert and adhesively secured decal were then loaded into a first mold half of an injection molding apparatus with the decal against the mold cavity wall. Mechanical pins secured the insert within the first mold half. The second mold half was closed tightly against the first mold half. Mold temperatures were maintained at approximately 55° F. Molten ABS at a temperature of about 430°–450° F was injected into the mold against the interior surface of the insert at 19,600 psi (pounds per square inch) for 0.95 seconds and then at 5,600 psi for 11.0 seconds. The average flow rate for the injected ABS was about 13.25 inches $^3$/second. After a 25 second cooling time, the injected ABS had cooled to a solid form. The mold was then opened, and the composite article was removed from the mold. The composite article comprised a body of ABS and an integral ABS decorative insert having an integrally embedded decal in its exterior surface.

Reasonable variation and modification are possible within the scope of the foregoing specification and drawings without departing from the spirit of the invention. For example, although the exterior surface 14 of the decorative insert 12 has been shown in the drawings as a generally planar surface, it does not have to be a planar surface. Also, the recess 24 formed in the decorative insert 12 need not be generally planar but should be a generally continuous surface such as a generally cylindrical, conical or spherical surface. However, if the recess 24 comprises a cylindrical, conical or spherical surface, the decorative insert should comprise a corresponding respective cylindrical, conical or spherical shape. It is also contemplated that the fourth step 36 in the process can be delayed until after completion of the seventh step 42. In other words, the protective carrier 26 could be left on the thermoplastic layer 20 of the label 16 during the injection molding step. Further, the decorative insert 12 could comprise sheet stock.

The embodiments for which an exclusive property or privilege is claimed are defined as follows:

1. A process for producing a label-bearing article having an exposed surface comprising the steps of:
    adhesively mounting a label to a first side of a thin thermoplastic substrate, the label being substantially smaller in length and width than the substrate so that the first side of the thermoplastic substrate substantially surrounds the label;
    placing the thermoplastic substrate and the affixed label into a mold cavity of an injection molding apparatus with the label-bearing first side against a wall of the mold cavity;
    injecting a molten thermoplastic resin under heat and pressure into the mold cavity so that the resin contacts a second side of the thermoplastic substrate to thereby firmly press the first side of the thermoplastic substrate and the affixed label against the wall of the mold cavity, thereby forming the article having an exposed surface comprising the label and said exposed portion of the first side of the thermoplastic substrate, the heat and pressure within the mold cavity being sufficient to at least partially recess the label into the first side of the thermoplastic substrate and integrally mold the thermoplastic substrate to the label;
    cooling the thermoplastic resin to solid form; and
    removing the composite article from the mold cavity.

2. A process according to claim 1 wherein the thermoplastic substrate comprises a thin sheet of thermoplastic material.

3. A process according to claim 1 wherein the thermoplastic substrate comprises a thin thermoplastic paint sheet.

4. A process according to claim 1 wherein a pressure sensitive adhesive is used to adhesively mount the label to the thermoplastic substrate.

5. A process according to claim 1 wherein a heat sensitive adhesive is used to adhesively mount the label to the thermoplastic substrate.

6. A process according to claim 1 wherein a wet adhesive is used to adhesively mount the label to the thermoplastic substrate.

7. A process according to claim 1 wherein the label comprises a decal, logo plate, badge, graphic or insignia.

8. A process according to claim 1 wherein the label comprises a thin sheet of thermoplastic material.

9. A process according to claim 1 wherein the label comprises a metal plate.

10. A process according to claim 1 wherein the label comprises a sheet of paper.

11. A process according to claim 1 wherein a protective sheet of material is removably affixed to the label and disposed between the label and the wall of the mold cavity during the resin injection step, and wherein the process further includes the step of removing the protective sheet from the label subsequent to removing the composite article from the mold cavity.

12. A process according to claim 1 wherein the thermoplastic resin is selected from the group consisting of polycarbonates, ABS, thermoplastic olefins, nylons, polyesters and blends thereof.

13. An article of manufacture produced by the process of claim 1.

* * * * *